United States Patent Office 3,103,232
Patented Sept. 10, 1963

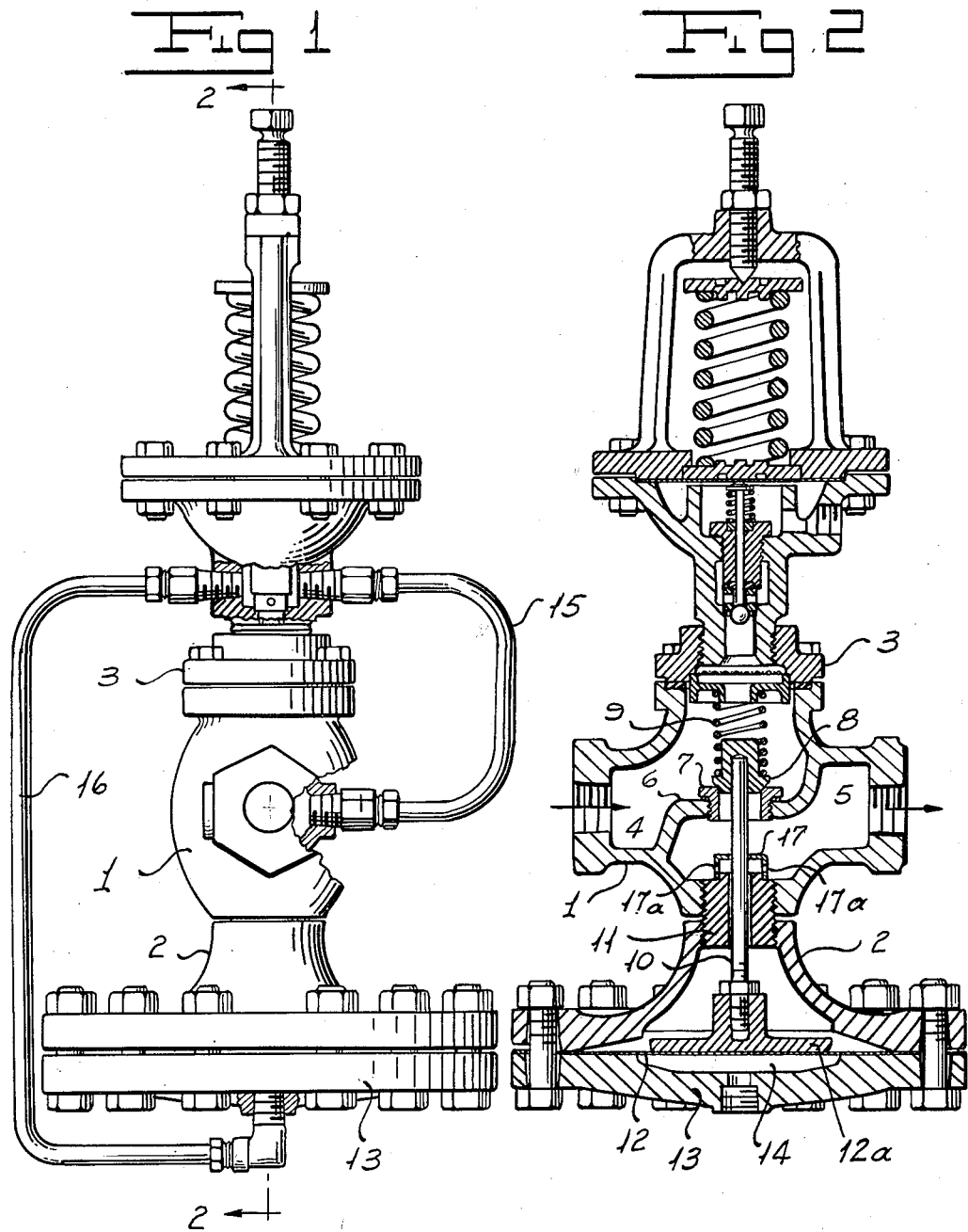

3,103,232
PRESSURE REDUCING VALVES
John W. Ritter, Emmaus, and Eduardo L. Cusi, Bethlehem, Pa., assignors to Sarco Company, Inc., New York, N.Y., a corporation of New York
Filed Apr. 7, 1961, Ser. No. 101,514
3 Claims. (Cl. 137—505.37)

This invention relates to pressure reducing valves having a housing with inlet and outlet passages, between which is interposed a valve seat through which fluid, adapted to flow downwardly through the seat, is controlled by a sealing member, commonly referred to as a valve, usually spring biased in the direction of its seat. The sealing member is provided with a valve stem which extends through a guide and is connected to a flexible diaphragm, operating under the influence of differential pressures, to control the position of the sealing member relative to its seat.

This diaphragm is of great importance in a pressure reducing valve. Its flexibility determines, in a large measure, the accuracy of the regulation of control and its life determines the overall durability of the valve. It is therefore desirable to render such diaphragm as sensitive as practically possible to these differential pressures, while protecting it from undue strains.

In valves of this kind, the sealing member is lifted from its seat by fluid pressure applied to the underside of the diaphragm from connections between the low pressure side of the pilot valve element of the reducing valve. Said sealing member is seated by the pressure of the spring, augmented by fluid pressure applied to the upper side of said diaphragm. This latter fluid pressure is supplied through clearance space between the valve stem and its guide. The fluid, under considerable pressure and at high velocity, flows downwardly through the valve seat and impinges directly upon the upper surface of the valve stem guide and a portion thereof passes downwardly through the clearance space between the guide and valve stem and exerts pressure on the corresponding side of the diaphragm.

This downward flow of fluid increases the pressure on the top of the diaphragm through two factors, namely, the static component and velocity component of the fluid stream. As the mass velocity through the valve seat increases, the velocity component naturally increases with it and, if this mass velocity component is impressed upon diaphragm, the pressure on the top of the diaphragm is correspondingly increased. Consequently, the pressure on the top of the diaphragm is a function of the flow rate. This induces fluctuations in controlled pressure and instability in the valve in addition to adversely affecting regulation of the controlled pressure.

As a result of prolonged research, experimentation and testing, we have discovered that these fluctuations and the resulting instability in the operation of the valve may be minimized or entirely overcome by associating with said clearance space appropriate means to so obstruct the flow velocity component that only the pressure, per se, in outlet passage of the valve is transmitted to that side of the diaphragm.

In the preferred forms of this invention, we accomplish this result by encircling the valve stem with a relatively close fitting baffle which overlies the aforesaid clearance space. This baffle takes the full force of the velocity component and deflects it radially away from the clearance space, leaving only the actual pressure in the downstream passage of the valve to be communicated through said clearance space to the diaphragm. Any little velocity flow between the baffle and the valve stem is allowed to escape through one or more outlets in or below the baffle.

With this baffle or deflector, relatively steady pressure conditions above the diaphragm are maintained and stability and close control of the outlet pressure are assured. This deflector can, of course, be made of any appropriate shape without departing from this invention.

Features of the invention, other than those adverted to, will be apparent from the hereinafter detailed description and appended claims, when read in conjunction with the accompanying drawings.

The accompanying drawings illustrate different practical embodiments of the invention, but the constructions therein shown are to be understood as illustrative, only, and not as defining the limits of the invention.

FIG. 1 is an elevation, partly in central section, showing a pressure reducing valve embodying the present invention.

FIG. 2 is a section on the line 2—2 of FIG. 1.

Referring to the drawings, FIGS. 1 and 2 show a pressure reducing valve which is, in main, conventional. It has a valve housing formed of upper and lower sections 1 and 2, surmounted by a bonnet 3, enclosing an appropriate pilot valve element. The upper section 1 has inlet and outlet passages 4 and 5, respectively, with an interposed partition 6 provided with a valve seat 7 and a sealing member 8 is urged to said seat 7 by a spring 9.

The sealing member has a valve stem 10 which extends downwardly through a guide 11 and is attached at its lower end to a pressure plate 12a which rests on the flexible diaphragm 12, marginally clamped between the lower section 2 of the housing and an end plate 13 provided therein with a cavity 14.

The bonnet structure forms no part of this invention. However, it may be here indicated that said bonnet is so constituted as to provide, inter alia, pressure controlling connections, e.g., by way of pipes 15 and 16 between the downstream or outlet passage of the valve and the cavity 14, all of which, in general, is conventional.

In FIG. 2, a baffle in the form of an inverted cup 17 is supported on the guide 11. It is perforated, with slight clearance, for the passage of the valve stem and its skirt has pressure balancing openings or passages 17a. Fluid, flowing downwardly through the seat 7 at high velocity impinges the upper surface of the cup 17 and is thereby arrested or laterally deflected and thus precluded from forcing its way downwardly through the clearance space between the valve stem 10 and its guide 11. The interior of the cup will, because of the openings 17a, be filled with fluid at the pressure in outlet passage 5 and this pressure will be communicated through the clearance space between the valve stem 10 and its guide 11, to be impressed on the diaphragm 12. Any small portion of the velocity component which enters the chamber within the cup will be effectually neutralized or stifled therein.

Practical experience with pressure reducing valves embodying the improvement of this invention has thoroughly demonstrated that, by the employment thereof, the diaphragm is rendered highly sensitive to the true differential pressures existing between the upstream and downstream passages of the valve and is not influenced by the velocity component of the flow. Furthermore said diaphragm is adequately protected against surges of pressure which would otherwise be impressed thereon by such velocity component. Consequently a finer reduction of pressures can be carried out with a valve so constituted and the life of the valve, and more particularly the diaphragm thereof, is materially prolonged over valves in which the present invention is not incorporated.

The foregoing detailed description sets forth the invention in its preferred practical form, but the invention is to be understood as fully commensurate with the appended claim.

Having thus fully described the invention, what we claim as new and desire to secure by Letters Patent is:

1. A fluid pressure reducing valve having a valve housing provided with inlet and outlet passages and an interposed valve seat, a sealing member cooperating with said seat and having a valve stem, a guide for said valve stem positioned on the downstream side of said seat with clearance space between said guide and stem through which pressure of fluid in the outlet passage may flow to a diaphragm positioned at the remote end of said guide from the valve seat and engaged by the valve stem and operable by differential pressures to control the seating and unseating of the sealing member, and a deflector unattached to and encircling the valve stem on the downstream side of the valve seat to form with the valve housing and stem an enclosed chamber around the latter, that portion of the deflector facing upstream encircling the stem closely enough to deflect the greater portion of the velocity of the fluid impinging said deflector and said deflector having a side wall portion with openings the aggregate cross sectional area of which is greater than the cross sectional area of the space between the upstream facing portion of the deflector and said stem.

2. A fluid pressure reducing valve according to claim 1, wherein the deflector comprises an inverted cup having opening in its peripheral wall.

3. A fluid pressure reducing valve according to claim 1, wherein the deflector is rigid with the valve housing.

References Cited in the file of this patent
UNITED STATES PATENTS

| | | |
|---|---|---|
| 508,135 | Gold | Nov. 7, 1893 |
| 1,745,256 | Groble | Jan. 28, 1930 |
| 2,295,208 | Grove | Sept. 8, 1942 |

FOREIGN PATENTS

| | | |
|---|---|---|
| 20,043 | Great Britain | Sept. 23, 1908 |
| 12,054 | Great Britain | May 18, 1911 |